United States Patent
Balzer et al.

(10) Patent No.: US 7,642,493 B2
(45) Date of Patent: Jan. 5, 2010

(54) LIGHT SENSOR FOR DETERMINING A POSITION OF A LIGHT SOURCE

(75) Inventors: Peter Balzer, Berlin (DE); Oliver Bard, Falkensee (DE); Gerald Kloiber, Feldkirchen (AT); Michael Kubiak, Berlin (DE); Gero Zimmermann, Berlin (DE)

(73) Assignee: EPCOS AG, Munich (DE)

( * ) Notice: Subject to any disclaimer, the term of this patent is extended or adjusted under 35 U.S.C. 154(b) by 133 days.

(21) Appl. No.: 10/590,088

(22) PCT Filed: Feb. 25, 2005

(86) PCT No.: PCT/DE2005/000322

§ 371 (c)(1),
(2), (4) Date: Apr. 20, 2007

(87) PCT Pub. No.: WO2005/082652

PCT Pub. Date: Sep. 9, 2005

(65) Prior Publication Data

US 2008/0135726 A1    Jun. 12, 2008

(30) Foreign Application Priority Data

Feb. 25, 2004    (DE) ................. 10 2004 009 172

(51) Int. Cl.
   G01C 21/02    (2006.01)
   G01C 21/24    (2006.01)
   G01J 1/20     (2006.01)
(52) U.S. Cl. .............. 250/203.3; 250/239; 359/254
(58) Field of Classification Search ... 250/203.1–203.4, 250/239; 359/48, 83, 254
   See application file for complete search history.

(56) References Cited

U.S. PATENT DOCUMENTS

| 5,264,690 A | 11/1993 | Lill |
| 5,455,415 A | 10/1995 | Yamada et al. |
| 5,543,958 A * | 8/1996 | Lebby et al. ................. 359/254 |
| 6,310,338 B1 | 10/2001 | Blasing |
| 2005/0199785 A1 | 9/2005 | Yamaguchi et al. |

FOREIGN PATENT DOCUMENTS

| DE | 38 21 743 | 1/1990 |
| DE | 44 07 911 | 9/1995 |
| EP | 0 350 866 | 1/1993 |
| EP | 0 549 707 | 6/1996 |
| EP | 1 262 747 | 12/2002 |
| WO | WO03/100367 | 12/2003 |

OTHER PUBLICATIONS

English translation of Written Opinion in Application No. PCT/DE2005/000322, issued on Jun. 2, 2005.
English translation for Written Opinion for PCT/DE2005/000322.

* cited by examiner

Primary Examiner—Seung C Sohn
(74) Attorney, Agent, or Firm—Fish & Richardson P.C.

(57) ABSTRACT

A light sensor for recording the position of a light source includes a photo detector and a light modulator. The light modulator is configured to modulate the quantity of light hitting the photo detector based on an incident angle ($\alpha$) of the light from the light source on the sensor.

20 Claims, 3 Drawing Sheets

LIGHT SENSOR FOR DETERMINING A POSITION OF A LIGHT SOURCE

TECHNICAL FIELD

The patent application describes a light sensor. Depending on the position of a light source with respect to the light sensor, the light sensor is used in particular to emit an electric signal.

BACKGROUND

Publication EP 0 350 866 B1 features a light sensor whereby a light diffuser is placed between a photo detector and light modulator for the purpose of the diffuse spreading of the light falling onto the sensor.

SUMMARY

A light sensor is disclosed in which the output signal of the light sensor can be positioned particularly well depending on the position of the light source.

A light sensor is specified, which is suitable to record the position of a light source relative to the light sensor. The light sensor includes at least an optical element to influence the dispersion direction of light, whereby this element is designed in such a manner that essentially the light, which falls onto the light sensor, is not diffusely dispersed. The avoidance of the diffuse dispersion has the advantage that the incident light beams are not subject to an uncontrolled deflection effect, as a result of which, the position-dependent radiation of the photo detector contained in the light sensor can be defined particularly well.

Accordingly, a light sensor is provided in which light that beams onto the sensor from the outside essentially falls onto a photo detector without dispersion. This means that no consciously inserted dispersion centers in the path of rays is provided. The path of rays merely consists of dispersion centers that are unavoidable from a manufacturing point of view.

The light sensor contains a photo detector, which preferably converts at least part of the light emitted by the light source into an electric signal. This electrical signal can be further processed by a suitable switch and for instance be used to determine the position of the light source.

A light modulator is provided in order to modulate the light quantity, which is beamed onto the photo detector depending on the incidence angle of the light emitted by the light source. The light modulator is thereby constructed in such a manner that it essentially presents direct optics, in other words, that the light beaming through the light modulator can get from the light source to the photo detector through a direct path of rays.

No diffuse element and no dispersion element, respectively, at which light beams are dispersed, is provided in the case of the light sensor specified. According to this, the light sensor specified has the advantage that the angle characteristic of the sensor can only be defined exactly by means of the light modulator and does not depend on the characteristics of multiple of less uncontrolled dispersion processes.

In a particularly advantageous embodiment of the light sensor, the latter is equipped with a sealing cap. Such a sealing cap has the advantage that the light sensor can be protected against external environmental influences. Such environmental influences include for instance pollution, dust or also aggressive gases.

Furthermore, the sealing cap has the advantage that it can be adjusted to the needs of the design, which is particularly advantageous in the application of the sensor in an automobile.

The light sensor described here can also record the position of a light source, for example the position of the sun. In addition, the intensity of the sun radiation can also be recorded in the case of a suitable photo detector, which generates a corresponding electrical signal depending on the incident light intensity. An electrical output signal is generated by means of the photo detector. This signal can for instance be used to control an air-conditioning system in a vehicle. The subjective feeling of heat of a vehicle's passengers, induced by the irradiation of the sun, can be simulated by means of the light sensor described here. Depending on the position of the sun to the vehicle and the photo detector, respectively, the light sensor will produce several output signals. Additionally, the signals of the photo detector are correlated with the intensity of the sun. It is furthermore desirable to achieve a specified output signal curve in certain cases.

The sealing cap is preferably transparent for the light wave length recorded by the photo detector. Furthermore, the sealing cap can also be colored in order to fulfill certain needs in the scope of design concepts.

As far as another embodiment of the light sensor is concerned, an absorption element is placed in the path of rays of the light hitting the photo detector. Such an absorption element preferably absorbs the light wave length for which the photo detector is sensitive. Accordingly, the absorption element fulfills the purpose of avoiding an over-modulation of the photo detector. The absorption element can preferably be placed in the path of rays between the sealing cap and the photo detector. The absorption element, however, can also be installed outside the sealing cap.

The absorption element is a disk, which is installed between the photo detector and the modulator, in a particular embodiment of the light sensor.

The light modulator is a transparent block, which is equipped with a cavity, in another embodiment of the light sensor. This cavity is preferably placed on the side of the light modulator turned away from the photo detector. The cavity can also be installed on the side of the light modulator where the light comes in.

In another embodiment of the light sensor, the cavity features disk-shaped areas lying on top of each other, whereby each of these areas presents a cone-formed side wall. Different fields can feature side walls in a particularly preferable manner, which include downward, in other words, towards the photo detector, an increasing angle with a normal one, which is positioned vertical on the photo detector. As a result, light that comes from outside and hits the light modulator can be reflected on the side walls of the frustum and, consequently, a certain intensity can be provided for each incident angle area in order to light up the photo detector.

Certain incident angles are preferably lead to the detector as a result of the slanting surfaces of the cone. The amplitude of the detector signal for this incident angle can be controlled via the size of the shell of the cone and the truncated cone (frustum), respectively.

Hereinafter, the invention is further clarified based on embodiments and the accompanying figures.

DETAILED DESCRIPTION

Figure 1:
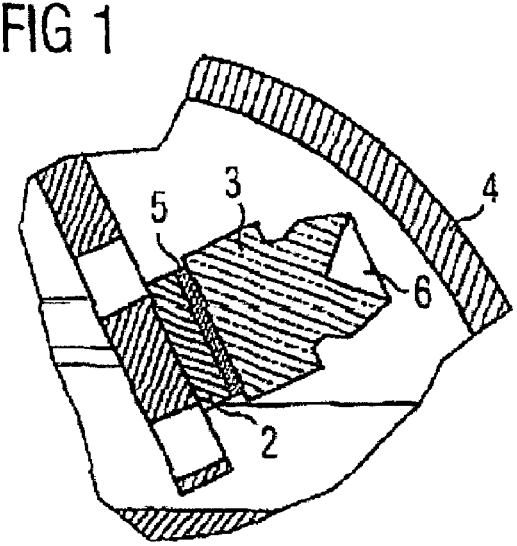
FIG. 1 shows a light sensor in a schematic cross section.

FIG. 1 shows a light sensor whereby a photo detector 2 is mounted on a support installation. The light sensor is covered by a sealing cap 4. Both the sealing cap 4 and the support element are merely shown in cross-section.

The sealing cap 4 essentially consists of a material with homogenous layer density. However, it is not necessarily made spherically. In other words, the cap 4 can divert from the semi-cone shape. The sealing cap 4 is not intended as light modulator, however, it cannot be excluded with absolute certainty that an angle-dependent change of intensity occurs at the cap 4 of the incident light.

An absorption element 5 is installed on the top side of the photo detector 2, which has the task to weaken the wavelength field, in which photo detector 2 is sensitive, in such a manner with regard to the incident light, so that the photo detector 2 is not overridden.

The absorption element 5 does not necessarily have to be made in the form of disk. It can also exist in the form of a grouting of the photo detector. The absorption element 5 can for instance feature a strong absorption in the infrared zone when the photo detector shows its highest sensitivity in infrared.

The sealing cap 4 is preferably transparent for the incident light coming from outside the light source. At best, the sealing cap 4 effectuates a very minor modulation of the light in proportion to the light modulator 3.

Additionally, a light modulator 3 is provided, which modulates light hitting the light sensor coming from a light source in such a manner that the signal output by the sensor depends on the incident angle of the light on the light sensor.

The light modulator 3 is equipped with a cavity 6.

The light modulator 3 can preferably be made out of a transparent material, for instance plexiglass or glass.

Figure 2:
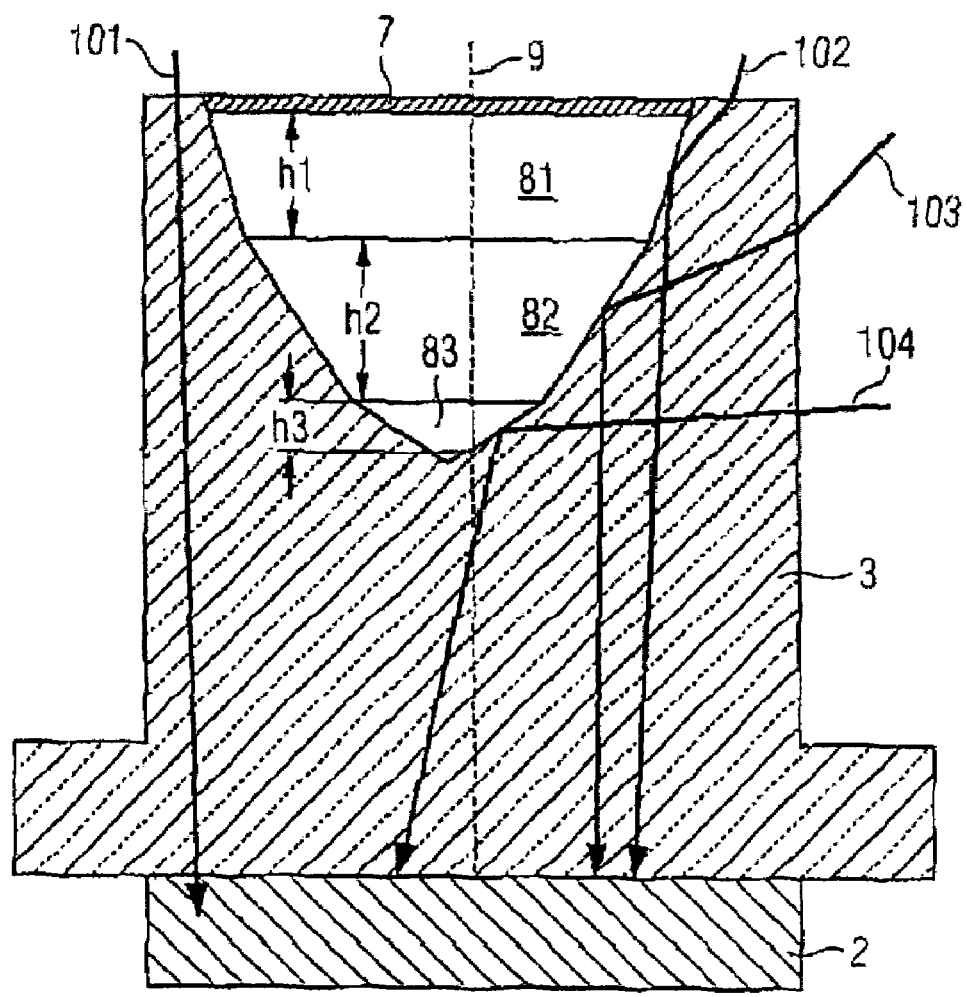
FIG. 2 shows the light modulator from FIG. 1 in an enlarged cross-sectional presentation.

FIG. 2 shows the light modulator from FIG. 1 in an enlarged representation. It can be recognized that the light modulator embraces a transparent block whereby a cavity 6 is provided on the top side. The cavity 6 is covered by means of a non-transparent lid 7. The cavity 6 can be divided in disk-like superposed areas 81, 82, 83 whereby each of these zones features a defined height $h_1, h_2, h_3$. Furthermore, each of these areas 81, 82, 83 can be compared with a frustum with regard to the styling of its side walls. The frustums thereby have different inclination angles of its sides in relation to perpendiculars 9, which is vertically placed on the sensitive surface of the photo detector 2. Based on the paths of rays 101, 102, 103, 104 shown in FIG. 2, the mode of action of the light modulator 3 can be clarified.

Light with a very large incident angle to the vertical 9, which is spread out along the path of rays 104, is reflected on the surface of photo detector 2 by the lowest disk through total reflection on the boundary layer block/cavity (which is generally filled with air). Accordingly, light, which features a flatter angle with regard to the vertical 9 and which runs along the path of rays 103, is broken up at the first boundary layer air/block and reflected at the second boundary layer block/air onto the surface of photo detector 2. The same applies for light, which follows path of rays 102, that hits vertical 9 in an even flatter way. Vertically incident light runs according to the path of rays 101 is lead directly onto the surface of the photo detector 2 laterally from the cavity 6 without any detours.

According to FIG. 2, each area 81, 82, 83 has a certain incident angle zone in which light is directed to the photo detector 2 from this truncated cone (frustum). The output signal of the photo detector can be set in a precise and differentiated manner through the variation of the height ratio, in other words, through the variation of the heights $h_1, h_2$ and $h_3$, respectively. A further differentiation can also take place by the fact that the number of partial areas 81, 82, 83 is further increased and, as a result, a higher number of angle zones are enabled.

Figure 3:
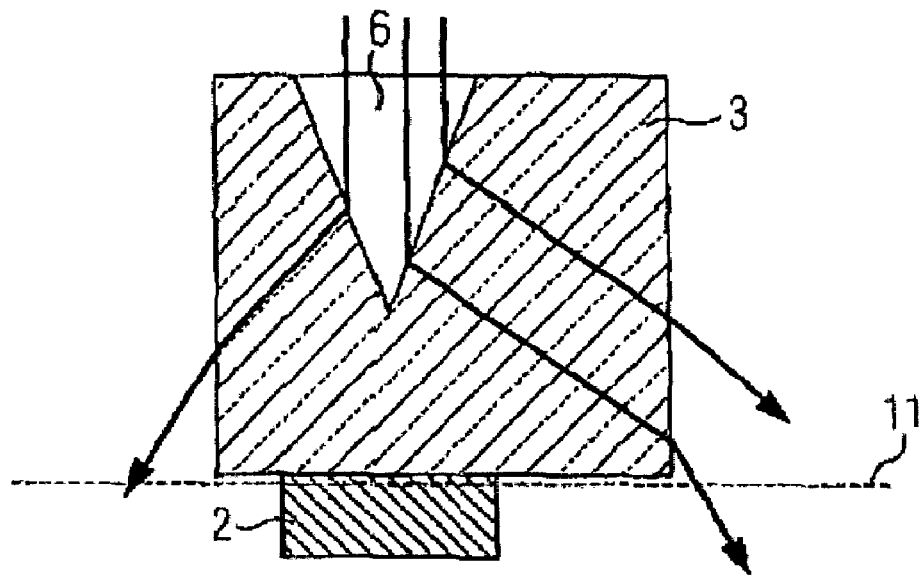
FIG. 3 shows another example for a light modulator in a schematic cross-section.

FIG. 3 shows an additional embodiment for a light modulator 3, which is also equipped with a cavity, in which, however, the non-transparent lid 7 from FIG. 2 is missing. Such a placement can be used for keeping off light falling vertically onto the surface of the photo detector 2, entirely or at least for a large portion of the photo detector 2. Consequently, a corresponding minimum can be realized in the sensitivity curve of the photo detector (cf. FIG. 4 for this purpose). The level of sensor surface 11 is also shown in FIG. 3, which is used for further reference in the description.

Figure 4:
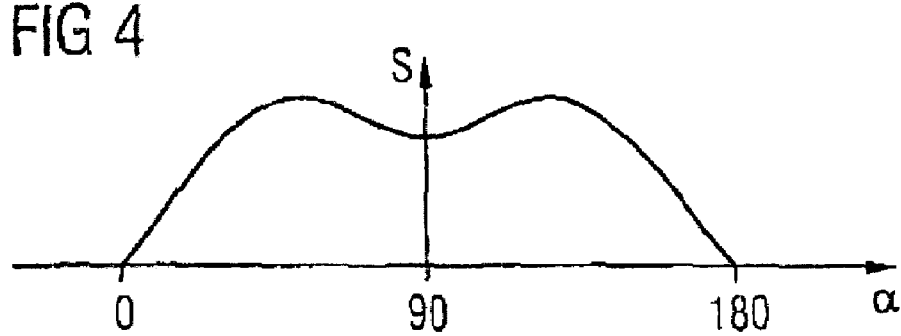
FIG. 4 shows a signal output curve for a photo detector depending on the elevation α.
Figure 5:
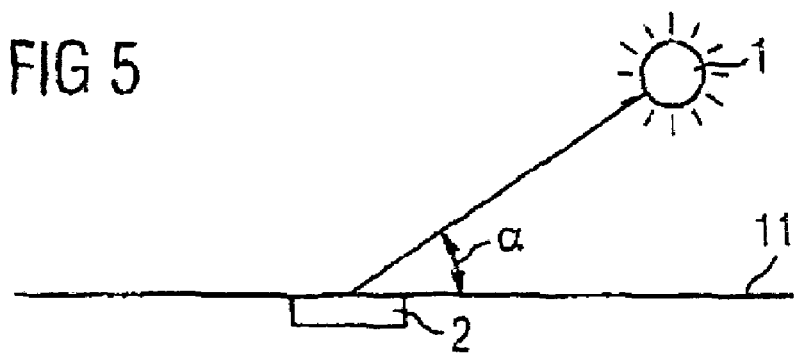
FIG. 5 shows the clarification of the term "elevation".

FIG. 4 shows the dependence of the signal S of the photo detector on the elevation α of the light source. The term elevation α is clarified in FIG. 5, in which a light source 1, for instance a sun, is displayed. Light that hits the photo detector 2 coming from the light source 1 creates an angle α with the level 11 of the sensor surface. This angle α corresponds with the elevation.

A minimum of the sensor signal S can be recognized in FIG. 4 in the zone α=90°, which results in FIG. 3 by leaving out lid 7.

Figure 6:
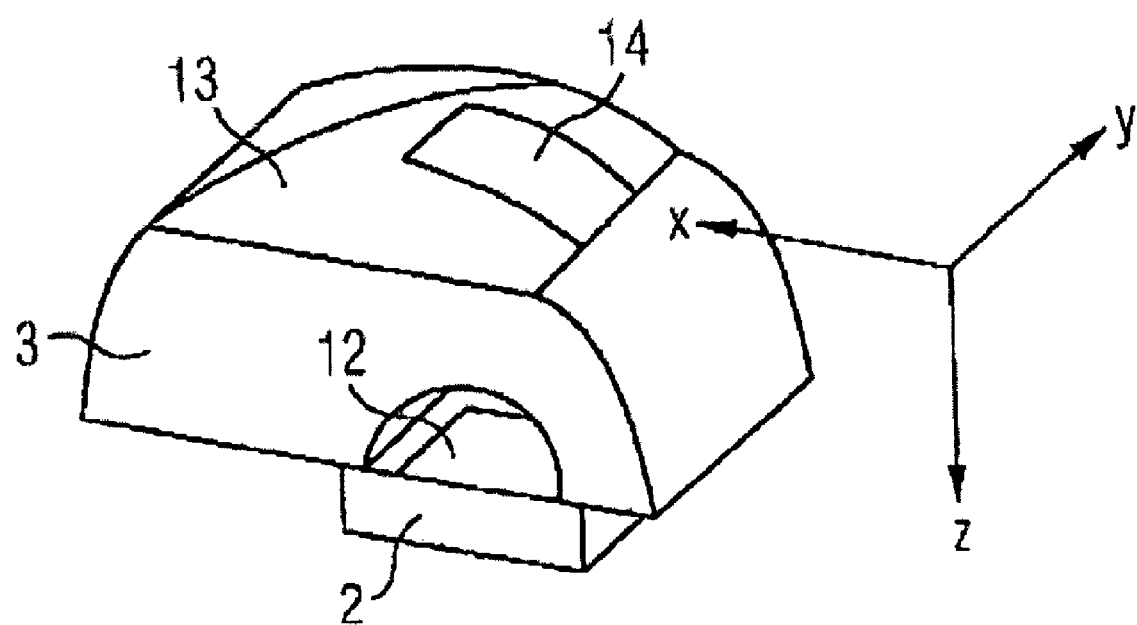
FIG. 6 shows another example for a light modulator.

FIG. 6 shows another embodiment for a light modulator 3. The light modulator 3 is placed above a photo detector 2 in the example of FIG. 6. Part of the surface of the photo detector 2 is thereby free, since the light modulator 3 shows a semi-cylindrical recess 12 at this position. The light modulator 3 itself features the form of a semi-cylinder. However, an angled polish is provided on the top side of the light modulator 3. This polish is used to set the output signal of the detector depending on the incident angle. Furthermore, surfaces can be present on the light modulator that absorb light. FIG. 6 shows such an absorbing surface 14, which is printed onto the angled polish 13. It can also be glued on.

The invention is not limited to the displayed and described embodiment. In fact, it encompasses all expert modifications, as well as partial and sub-combinations of the described measures. Particularly the light modulator can take on any form.

The invention claimed is:

1. A light sensor for determining a position of a light source, the light sensor comprising:
    a photodetector, and
    a light modulator configured to modulate a quantity of light hitting the photodetector based on an incident angle (α) of output light from the light source,
    wherein the light hitting the photodetector falls on the photodetector without substantial dispersion of the light, and
    wherein the light modulator comprises a transparent block having a cavity formed in a side of the transparent block where the light enters the transparent block.

2. The light sensor of claim 1, further comprising a sealing cap.

3. The light sensor of claim 1, further comprising an absorption element in a path of at least some rays of the light.

4. The light sensor of claim 3, wherein the absorption element comprises a disk between the photodetector and the light modulator.

5. The light sensor of claim 1, wherein the cavity includes disk-shaped superposed areas.

6. The light sensor of claim 5, wherein the disk-shaped superposed areas each include cone-shaped side walls.

7. The light sensor of claim 1, wherein the photodetector is configured to convert at least a portion of the light hitting the photodetector into an electric signal.

8. The light sensor of claim 7, further comprising a switch configured to determine a position of the light source based on the electric signal.

9. A system, comprising the light sensor of claim 1, wherein the photodetector is configured to:
   determine a position of a light source;
   determine an intensity of the light source; and
   generate an output signal to control an air-conditioning system in a vehicle based on the position and intensity of the light source.

10. The system of claim 9, wherein the cavity includes disk-shaped superposed areas.

11. The system of claim 10, wherein the disk-shaped superposed areas each include cone-shaped side walls.

12. The system of claim 9, wherein the photodetector is configured to convert at least a portion of the light hitting the photodetector into an electric signal.

13. The system of claim 12, further comprising a switch configured to determine a position of the light source based on the electric signal.

14. A light sensor, comprising:
   a photodetector, and
   a light modulator configured to modulate a quantity of light hitting the photodetector, the light modulator comprising a transparent block having a cavity formed in a side of the transparent block where the light enters the transparent block, the cavity including disk-shaped superposed areas having cone-shaped side walls configured to direct the light onto a particular portion of the photodetector based on an incident angle of the light.

15. The light sensor of claim 14, wherein the light hitting the photodetector falls on the photodetector without substantial dispersion of the light.

16. The light sensor of claim 14, wherein the light modulator is configured to modulate the quantity of light hitting the photodetector based on an incident angle ($\alpha$) of the light.

17. The light sensor of claim 14, further comprising a sealing cap.

18. The light sensor of claim 14, further comprising an absorption element in the path of at least some of the rays of the light.

19. The light sensor of claim 18, wherein the absorption element comprises a disk between the photodetector and the modulator.

20. The light sensor of claim 14, wherein the photodetector is configured to generate an output signal to control an air-conditioning system in a vehicle based on a position and intensity of a light source that provides the light.

* * * * *